United States Patent Office 2,773,876
Patented Dec. 11, 1956

2,773,876

TERTIARY - AMINOALKOXYMETHYL - 1-(LOWER ALKYL) PIPERIDINES AND PREPARATION THEREOF

Bill Elpern, Albany, N. Y., assignor to Sterling Drug Inc., New York, N. Y., a corporation of Delaware No Drawing. Application June 4, 1953,
Serial No. 359,638

17 Claims. (Cl. 260—294.7)

The invention relates to tertiary-aminoalkoxymethyl-1-(lower alkyl)piperidines, to their salts, and to the preparation of these compounds.

My new compounds in their free base form have the general formula

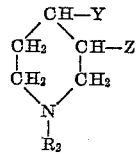

where $R_2$ is a lower alkyl radical and one of Y and Z is hydrogen and the other is a tertiary-aminoalkoxymethyl radical having the formula

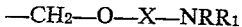
$$-CH_2-O-X-NRR_1$$

where X is a lower alkylene radical whose two free valence bonds are on different carbon atoms and $NRR_1$ is a member of the group consisting of di-(lower alkyl)-amino, 1-piperidyl, (lower alkylated)-1- piperidyl, 1-pyrrolidyl, (lower alkylated)-1-pyrrolidyl and 4-morpholinyl.

In the above general formula the lower alkylene radical designated above as X has two to four carbon atoms, including such examples as

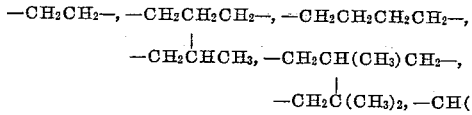

$-CH_2CH_2-, -CH_2CH_2CH_2-, -CH_2CH_2CH_2CH_2-,$ $-CH_2CHCH_3, -CH_2CH(CH_3)CH_2-,$ $-CH_2C(CH_3)_2, -CH(CH_3)CHCH_3$ and the like. The tertiary-amino radical, shown above as $NRR_1$, comprehends dialkylamino radicals where R and $R_1$ are lower alkyl groups, alike or different, and each alkyl group has one to six carbon atoms, such dialkylamino radicals including dimethylamino, diethylamino, ethylmethylamino, diisopropylamino, ethyl-n-propyl-amino, di-n-butylamino, di-n-hexylamino, and the like. Further, the tertiary-amino radical designated as $NRR_1$ encompasses saturated N-heteromonocyclic radicals having five to six ring atoms, illustrated by examples such as 1-piperidyl; (lower alkylated)-1-piperidyl such as 2-methyl-1-piperidyl, 3-ethyl-1-piperidyl, 4-methyl-1-piperidyl, 2,6-dimethyl-1-piperidyl; 1-pyrrolidyl; (lower alkylated)-1-pyrrolidyl such as 2-methyl-1-pyrrolidyl, 3-ethyl-1-pyrrolidyl, 2,5-dimethyl-1-pyrrolidyl; 4-morpholinyl; and the like. $R_2$, the lower alkyl radical, has one to six carbon atoms, including such radicals as methyl, ethyl, n-propyl, n-butyl, isobutyl, 2-butyl, n-amyl, isoamyl, n-hexyl, and the like.

The tertiary-aminoalkoxymethylpiperidines of my invention were prepared by heating an alkali metal salt of 1-(lower alkyl)-3(or 4)-piperidinemethanol with a tertiary-aminoalkyl halide of the formula halogen-X-$NRR_1$. Illustrations of this process are the preparations of 3-(2-diethylaminoethoxymethyl)-1-ethylpiperidine by heating the sodium salt of 1-ethyl-3-piperidine-methanol with 2-diethylaminoethyl chloride and the preparation of 4-[3-(2-methyl-1-piperidyl)-propoxymethyl]-1-methylpiperidine by heating the sodium salt of 1-methyl-4-piperidinemethanol with 3-(2-methyl-1-piperidyl)propyl chloride. In practicing my invention I found it convenient to use the tertiary-aminoalkyl halide in the form of its hydrohalide salt, the acid portion of which was neutralized by excess sodium amide, the reagent I preferred to use in forming the alkali salt of the intermediate 4-piperidinemethanol.

Preferred embodiments of my invention are quaternary ammonium salts of the above defined tertiary-aminoalkoxymethyl-1-alkylpiperidines, said salts having the general formula

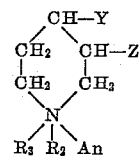

where one of Y and Z is hydrogen and the other is a quaternary-aminoalkoxymethyl radical having the formula

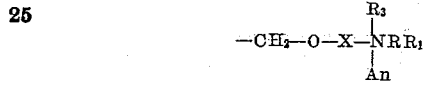

$$-CH_2-O-X-\overset{R_3}{\underset{An}{N}}RR_1$$

and where R, $R_1$, $R_2$ and X have the meanings given above, $R_3$ is a lower alkyl radical or a benzyl radical and An is a non-toxic anion. These quaternary ammonium salts have been found to have curarimimetic and ganglionic blocking properties.

In the above formula, $R_3$ is a lower alkyl radical having one to six carbon atoms, including such radicals as methyl, ethyl, n-propyl, isopropyl, n-butyl, isobutyl, 2-butyl, n-amyl, isoamyl, n-hexyl, and the like. The non-toxic anion, designated as An, which can be any anion, for instance, chloride, bromide, iodide, sulfate, benzenesulfonate, paratoluenesulfonate, and the like, has no appreciable pharmacological activity of its own in the high dilutions at which the quaternary ammonium salts as a whole are effective. In particular, the anions contribute nothing to the ganglionic blocking or curarimimetic activity which resides solely in the remainder of the molecule.

Thus, my invention comprehends, as the preferred embodiment, quaternary ammonium salts of the above defined tertiary-aminoalkoxymethyl-1-alkylpiperidines, said salts being derived from lower alkyl or benzyl esters of an acid, either inorganic or organic, such esters having the formula $R_3An$ and including methyl iodide, methyl bromide, ethyl chloride, ethyl bromide, ethyl sulfate, n-propyl iodide, benzyl chloride, para-nitrobenzyl chloride, para-chlorobenzyl chloride, methyl para-toluenesulfonate, ethyl para-toluenesulfonate, ethyl benzenesulfonate, and the like, the respective quaternary salts being the methiodides, methobromides, ethochlorides, ethobromides, ethosulfates, n-propiodides, benzochlorides, para-nitrobenzochlorides, para-chlorobenzochlorides, metho-para-toluenesulfonates, etho-para-toluenesulfonates, ethobenzenesulfonates, and the like.

Sometimes direct addition of an ester, $R_3An$, to the tertiary-aminoalkoxymethyl-1-alkylpiperidine does not occur readily due to the properties of the particular ester used. This is the case if the anion, An, is derived from a relatively weak acid such as citric acid or tartaric acid. In such cases it is possible by use of metathetical reactions to replace the anion without reconversion to the tertiary amine. This is usually effected by treatment of an aqueous solution of the quaternary ammonium salt, QAn, with silver oxide (hydroxide). The silver salt, AgAn, is precipitated, leaving in solution the quaternary ammonium hydroxide, QOH. It is prerequisite, of course, that the salt AgAn be insoluble in water. The quaternary ammonium hydroxide may then be neutralized with the appropriate acid, HAn', to give any desired salt. For example, methiodides are generally easier to prepare by direct addition than methochlorides. Methyl iodide reacts more readily with tertiary-amines and is more convenient to use than methyl chloride. However, the methochloride can be readily prepared from the methiodide by the method just described. Treatment of a solution of the methiodide with silver oxide precipitates silver iodide leaving a solution of the quaternary ammonium hydroxide. Neutralization of this solution with hydrochloric acid gives the methochloride which can be obtained by concentrating the solution. Similarly, using citric or tartaric acid in place of hydrochloric acid, the respective methocitrate or methotartrate is obtained.

My invention also comprehends acid addition salts of the above described tertiary-aminoalkoxymethyl-1-alkyl-piperidines, such salts being prepared by treating the basic piperidine derivatives with the appropriate acid. Included among such acid addition salts are the following, formed by reacting the basic piperidine compound with the appropriate relatively non-toxic inorganic or organic acid: the hydrochloride, hydrobromide, hydroiodide, phosphate, sulfate, sulfamate, ethanesulfonate, tartrate, citrate, succinate, acetate, benzoate, oleate, and the like.

The compounds of my invention are further illustrated by the following examples without however being limited thereto.

EXAMPLE 1

*3-(2-diethylaminoethoxymethyl)-1-methylpiperidine*

To 1.95 g. of sodium amide suspended in 200 ml. of dry toluene was added 6.4 g. of 1-methyl-4-piperidinemethanol and the resulting mixture refluxed until complete solution was effected. The solution was cooled slightly and there was added another 1.95 g. portion of sodium amide followed by 8.6 g. of 2-diethylaminoethyl chloride hydrochloride. The resulting mixture was heated at about 110° C. with stirring for four hours. The reaction mixture was then allowed to cool and 50 ml. of water was added carefully to dissolve any unreacted sodium amide and the sodium chloride that had separated. The organic layer was separated and washed with water. The aqueous layer was extracted with benzene and the extracts combined with the organic layer. The resulting solution was filtered and the solvent removed by distillation in vacuo. Fractional distillation of the material that remained yielded the product, 3-(2-diethylaminoethoxymethyl)-1-methylpiperidine, B. P. 113–118° C. at 3.2 mm.; $n_D^{25}$ 1.4492.

*Analysis.*—Calcd. for $C_{13}H_{28}N_2O$: C, 68.37; H, 12.36; N, 12.27. Found: C, 68.60; H, 12.41; N, 12.54.

Other compounds which can be prepared according to the above procedure using the appropriate 1-(lower alkyl)-3(or 4)-piperidinemethanol and tertiary-aminoalkyl halide include the following: 3-(4-dimethylaminobutoxymethyl)-1-methylpiperidine, 4-(2-dimethylaminoethoxymethyl)-1-n-propylpiperidine, 3-(3-diethylamino-2-methylpropoxymethyl)-1-ethylpiperidine, 4-(2-diethylaminopropoxymethyl)-1-methylpiperidine, 3-(2-di-n-butylaminoethoxymethyl)-1-methylpiperidine, 4-(3-diethylaminopropoxymethyl)-1-isobutylpiperidine, and the like.

EXAMPLE 2

*4-[2-(1-piperidyl)ethoxymethyl]-1-methylpiperidine*

This preparation was carried out following the procedure described in Example 1, using 6.46 g. of 1-methyl-4-piperidinemethanol, 9.0 g. of sodium amide and 9.2 g. of 2-(1-piperidyl)ethyl chloride hydrochloride and 200 ml. of dry toluene. There was thus obtained, as a straw-colored oil, 5.2 g. of 4-[2-(1-piperidyl)ethoxymethyl]-1-methylpiperidine B. P. 148–149° C. at 3.2 mm., $n_D^{25}$ 1.4782.

Other 4(or 3)-(tertiary-aminoalkoxymethyl)-1-(lower alkyl)-piperidines can be prepared according to the foregoing procedure using the appropriate 1-(lower alkyl)-4(or 3)-piperidinemethanol and tertiary-aminoalkyl halide hydrohalide. Such compounds including the following: 4 - [2 - (3 - ethyl - 1 - piperidyl)ethoxymethyl] - 1 - isopropylpiperidine, 3 - [3 - (2 - methyl - 1 - piperidyl)propoxymethyl]-1-n-propylpiperidine, 4-[3-(1-pyrrolidyl)propoxymethyl]-1-methylpiperidine, 3-[2-(2,5-dimethyl-1-pyrrolidyl)ethoxymethyl]-1-ethylpiperidine, 4-[4-(1-piperidyl)butoxymethyl] - 1 - methylpiperidine, 3 - [3 - (1 - piperidyl)propoxymethyl] - 1 - n - hexylpiperidine, and the like.

EXAMPLE 3

*3-(2-diethylaminoethoxymethyl)-1-methylpiperidine dimethiodide*

A solution of 4 g. of 3-(2-diethylaminoethoxymethyl)-1-methylpiperidine (prepared as in Example 1) in dry benzene was treated with 10 ml. of methyl iodide. The oily product separated and solidified. The solid was collected and recrystallized twice from ethanol-isopropanol, twice from methanol-isopropanol and once from isopropanol-ethyl acetate. There was thus obtained 3 - (2 - diethylaminoethoxymethyl) - 1 - methylpiperidine dimethiodide, M. P. 234.6–235.8° C. (cor.).

*Analysis.*—Calcd. for $C_{15}H_{34}I_2N_2O$: C, 35.16; H, 6.69; I, 49.56. Found: C, 35.32; H, 6.69; I, 49.15.

When the procedure described above for the preparation of 3-(2-diethylaminoethoxymethyl)-1-methylpiperidine dimethiodide is followed using methyl bromide, ethyl chloride, n-propyl iodide, benzyl chloride or ethyl para-toluenesulfonate in place of methyl iodide, there is obtained, respectively, 3-(2-diethylaminoethoxymethyl)-1-methylpiperidine dimethobromide, 3-(2-diethylaminoethoxymethyl)-1-methylpiperidine diethochloride, 3-(2-diethylaminoethoxymethyl)-1-methylpiperidine di-n-propiodide, 3-(2-diethylaminoethoxymethyl)-1-methylpiperidine dibenzochloride or 3-(2-diethylaminoethoxymethyl)-1-methylpiperidine dietho-para-toluenesulfonate.

Following the above procedure for the preparation of 3 - (2 - diethylaminoethoxymethyl) - 1 - methylpiperidine dimethiodide using the appropriate piperidine derivative in place of 3 - (2 - diethylaminoethoxymethyl) - 1 - methylpiperidine, there can be obtained the following quaternary salts: 3 - (4 - dimethylaminobutoxymethyl) - 1 - methylpiperidine dimethiodide, 4 - (2 - dimethylaminoethoxymethyl) - 1 - n - propylpiperidine dimethiodide, 3 - (3 - diethylamino - 2 - methylpropoxyethyl) - 1 - ethylpiperidine dimethiodide, (4 - (2 - diethylaminopropoxymethyl) - 1 - methylpiperidine dimethiodide, 3 - (2-di - n - butylaminoethoxymethyl) - 1 - methylpiperidine dimethiodide, (4 - (3 - diethylaminopropoxymethyl) - 1 - isobutylpiperidine dimethiodide, and the like.

EXAMPLE 4

*4 - [2 - (1 - piperidyl)ethoxymethyl] - 1 - methylpiperidine dimethiodide*

This compound, M. P. 280–283° C. (cor.), was prepared following the procedure described in Example 3, using a solution 2.4 g. of 4-[2-(1-piperidyl)ethoxymethyl]-1-methylpiperidine in 50 ml. of ethyl acetate and 5 ml. of methyl iodide. The precipitate that separated was collected and recrystallized once from ethanol and once from ethanol-ethyl acetate.

*Analysis.*—Calcd. for $C_{16}H_{34}I_2N_2O$: C, 36.66; H, 6.54; I, 48.43. Found: C, 36.59; H, 6.54; I, 48.09.

Other 4(or 3) - (tertiary - aminoalkoxymethyl) - 1 - (lower alkyl)-piperidines can be prepared according to the foregoing procedure using other (tertiary-aminoalkoxymethyl) - 1 - (lower alkyl)piperidines, such compounds including the following: (4-[2-(3-ethyl-1-piperidyl)ethoxymethyl] - 1 - isopropylpiperidine dimethiodide, 3 - [3 - (2 - methyl - 1 - piperidyl)propoxymethyl] - 1- n - propylpiperidine dimethiodide, 4 - [3 - (1 - pyrrolidyl) propoxymethyl] - 1 - methylpiperidine dimethiodide, 3-[2 - (2,5 - dimethyl - 1 - pyrrolidyl) - ethoxymethyl]-1-ethylpiperidine dimethiodide, 4-[4 - (1 - piperidyl)butoxymethyl] - 1 - methylpiperidine dimethiodide, 3 - [3 - (1-piperidyl)propoxymethyl] - 1 - n - hexylpiperidine dimethiodide, and the like.

The (tertiary - aminoalkoxymethyl) - 1 - (lower alkyl) piperidine quaternary salts of Examples 3 and 4 when tested for curarimimetic activity in mice using the inclined screen test were found to have ED₅₀'s of about 18 to 25 mg./kg. and when tested for ganglionic blocking activity in anesthetized dogs were found to be from about one to two times as effective as tetraethylammonium bromide in blocking each of the parasympathetic and sympathetic ganglia. The acute toxicities (LD₅₀) of the quaternary salts when tested subcutaneously in mice were found to be from about 55 to 75 mg./kg.

I claim:

1. A member of the group consisting of a compound having the formula

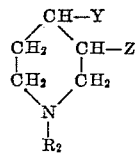

where $R_2$ is a lower alkyl radical and one of Y and Z is hydrogen and the other is tertiary-aminoalkoxymethyl radical having the formula —CH₂—O—X—NRR₁ where X is a lower alkylene radical having from 2 to 4 carbon atoms whose two free valence bonds are on different carbon atoms and NRR₁ is a member of the group consisting of di-(lower alkyl) amino, 1-piperidyl, (lower alkylated)-1-piperidyl, 1-pyrrolidyl, (lower alkylated)-1-pyrrolidyl and 4-morpholinyl, and its acid addition and di-quaternary ammonium salts.

2. A quaternary ammonium salt of a 3-(dialkylaminoalkoxymethyl)-1-(lower alkyl) piperidine having the formula

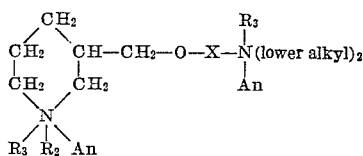

where X is a lower alkylene radical having from 2 to 4 carbon atoms whose two free valence bonds are on different carbon atoms, $R_2$ and $R_3$ are each lower alkyl radicals and An is a non-toxic anion.

3. A quaternary ammonium salt of a 3-(tertiary-aminoalkoxymethyl)-1-(lower alkyl) piperidine having formula

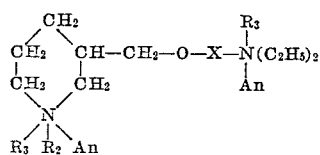

where X is a lower alkylene radical having from 2 to 4 carbon atoms whose two free valence bonds are on different carbon atoms, $R_2$ and $R_3$ are each lower alkyl radicals and An is a non-toxic anion.

4. A quaternary ammonium salt of a 4-(tertiary-aminoalkoxymethyl)-1-(lower alkyl)piperidine having the formula

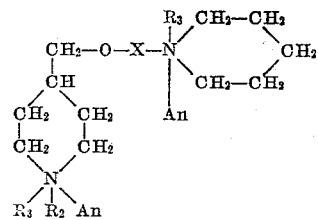

where X is a lower alkylene radical having from 2 to 4 carbon atoms whose two free valence bonds are on different carbon atoms, $R_2$ and $R_3$ are each lower alkyl radicals, and An is a non-toxic anion.

5. A 3-(tertiary-aminoalkoxymethyl)-1-(lower alkyl)-piperidine having the formula

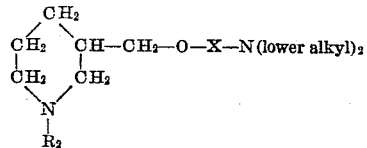

where X is a lower alkylene radical having from 2 to 4 carbon atoms whose two free valence bonds are on different carbon atoms and $R_2$ is a lower alkyl radical.

6. A 4-(tertiary-aminoalkoxymethyl)-1-(lower alkyl)-piperidine having the formula

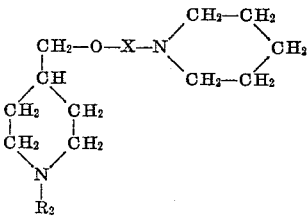

where X is a lower alkylene radical having from 2 to 4 carbon atoms whose two free valence bonds are on different carbon atoms and $R_2$ is a lower alkyl radical.

7. A dimethohalide of 3-(2-diethylaminoethoxymethyl)-1-methylpiperidine.

8. A dimethohalide of 4-[2-(1-piperidyl)ethoxymethyl]-1-methylpiperidine.

9. 3 - (2- diethylaminoethoxymethyl)- 1 - methylpiperidine.

10. 4- [2- (1-piperidyl)ethoxymethyl]- 1- methylpiperidine.

11. A process for the preparation of a compound having the formula

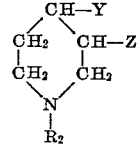

where $R_2$ is a lower alkyl radical and one of Y and Z is hydrogen and the other is a tertiary-aminoalkoxymethyl radical having the formula —CH₂—O—X—NRR₁ where X is a lower alkylene radical having from 2 to 4 carbon atoms whose two free valence bonds are on different carbon atoms and NRR₁ is a member of the group consisting of di-(lower alkyl)amino, 1-piperidyl, (lower alkylated)-1-piperidyl, 1-pyrrolidyl, (lower alkylated)-1-pyrrolidyl and 4-morpholinyl, which comprises heating an alkali metal salt of a member of the group consisting of a 1-(lower alkyl)-3-piperidemethanol and a 1-(lower alkyl)-4-piperidinemethanol with a tertiary-aminoalkyl halide of the formula halogen—X—NRR₁.

12. A process for the preparation of a 4-(tertiary-aminoalkoxymethyl)-1-(lower alkyl)piperidine having the formula

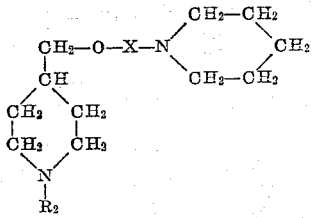

where X is a lower alkylene radical having from 2 to 4 carbon atoms whose two free valence bonds are on different carbon atoms and $R_2$ is a lower alkyl radical, which comprises heating an alkali metal salt of a 1-(lower alkyl)-4-piperidinemethanol with a tertiary-aminoalkyl halide of the formula

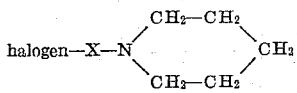

13. A process for the preparation of a 3-(dialkylaminoalkoxymethyl)-1-(lower alkyl)piperidine having the formula

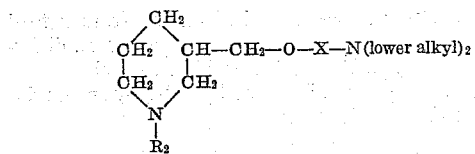

where X is a lower alkylene radical whose two free valence bonds are on different carbon atoms and $R_2$ is a lower alkyl radical, which comprises heating an alkali metal salt of a 1-(lower alkyl)-3-piperidinemethanol with a dialkylaminoalkyl halide of the formula halogen—X—N(lower alkyl)$_2$.

14. A process for the preparation of 4-[2-(1-piperidyl)-ethoxymethyl]-1-methylpiperidine which comprises heating an alkali metal salt of 1-methyl-4-piperidinemethanol with a 2-(1-piperidyl)ethyl halide.

15. A process for the preparation of 3-(2-diethylaminoethoxymethyl)-1-methylpiperidine which comprises heating an alkali metal salt of 1-methyl-3-piperidinemethanol with a 2-diethylaminoethyl halide.

16. A process for the preparation of a dimethohalide of 4-[2-(1-piperidyl)ethoxymethyl]-1-methylpiperidine which comprises reacting 4-[2-(1-piperidyl)ethoxymethyl]-1-methylpiperidine with a methyl halide.

17. A process for the preparation of a dimethohalide of 3-(2-diethylaminoethoxymethyl)-1-methylpiperidine which comprises reacting 3-(2-diethylaminoethoxymethyl)-1-methylpiperidine with a methyl halide.

No references cited.